(12) United States Patent
Nimura

(10) Patent No.: US 6,425,827 B1
(45) Date of Patent: Jul. 30, 2002

(54) GAME MACHINE AND INFORMATION STORAGE MEDIUM

(75) Inventor: Shinobu Nimura, Kanagawa-ken (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/446,391

(22) PCT Filed: Apr. 23, 1999

(86) PCT No.: PCT/JP99/02170

§ 371 (c)(1),
(2), (4) Date: Feb. 2, 2000

(30) Foreign Application Priority Data

Apr. 24, 1998 (JP) .......................................... 10-131387

(51) Int. Cl.⁷ ............................................... A63F 13/00
(52) U.S. Cl. ................................ 463/35; 463/8; 463/23; 463/1
(58) Field of Search ........................ 463/1, 4, 8, 30–35; 348/515, 516

(56) References Cited

U.S. PATENT DOCUMENTS

| | | | | |
|---|---|---|---|---|
| 4,305,131 A | * | 12/1981 | Best | 364/521 |
| 4,333,152 A | * | 6/1982 | Best | 364/521 |
| 4,445,187 A | * | 4/1984 | Best | 364/521 |
| 4,569,026 A | * | 2/1986 | Best | 364/521 |
| 4,657,247 A | * | 4/1987 | Okada | 273/1 E |
| 4,858,930 A | * | 8/1989 | Sato | 273/85 G |
| 5,358,259 A | * | 10/1994 | Best | 273/434 |
| 5,720,663 A | * | 2/1998 | Nakatani et al. | 463/23 |
| 5,800,265 A | * | 9/1998 | Yamazaki et al. | 463/23 |
| 6,146,269 A | * | 11/2000 | Morihira | 463/8 |
| 6,162,120 A | * | 12/2000 | Takahashi et al. | 463/8 |
| 6,184,937 B1 | * | 2/2001 | Williams et al. | 348/515 |
| 6,203,426 B1 | * | 3/2001 | Matsui et al. | 463/6 |

FOREIGN PATENT DOCUMENTS

| | | |
|---|---|---|
| JP | 62-155880 | 7/1987 |
| JP | 7-124280 | 5/1995 |
| JP | 8-318051 | 12/1996 |
| JP | 10-33830 | 2/1998 |
| JP | 10-337379 | 12/1998 |
| JP | 11-33228 | 2/1999 |

OTHER PUBLICATIONS

"Game Walker", No. 27, Kadokawa Shoten Publishing Co., Ltd. Jan. 1, 1997, pp. 38.

* cited by examiner

Primary Examiner—Jessica J. Harrison
Assistant Examiner—Alex F. R. P. Rada, II
(74) Attorney, Agent, or Firm—Oliff & Berridge, PLC

(57) ABSTRACT

The objective of the present invention is to provide a game machine and an information storage medium that make it possible to intensify the dramatic effect of a game by the voices sounded by a character. The pitch, volume, or tone of each voice sounded by characters (20) and (22) is varied in accordance with a physical strength parameter, the remaining play time, the progressing degree through game stages, or a number of wins. The pitch and volume of a voice sounded by a character increase as an opponent's physical strength parameter becomes larger, the remaining play time decreases, the final game stage approaches, or the opponent's number of wins becomes larger. The pitch, volume, or tone of voices is varied after the remaining play time has reached a given value or a given game stage has been passed. The increase in pitch of a voice sounded by a character is a whole tone or less.

40 Claims, 13 Drawing Sheets

FIG.3

| | MUSIC SCORE DATA | PITCH DATA | VOLUME DATA | TONE DATA |
|---|---|---|---|---|
| CHANNEL 1 | | 1.0 | 1.0 | DRUM |
| CHANNEL 2 | | 1.0 | 1.0 | PIANO |
| CHANNEL 3 | | 1.0 | 1.0 | GUITAR |
| CHANNEL 4 | KA-CHING BA-SH KA-CHING | 1.0 | 1.0 | TONE A |
| CHANNEL 5 | YAHH! SORA! TORYA! | 1.0 | 1.0 | TONE B |

FIG. 4

| | MUSIC SCORE DATA | PITCH DATA | VOLUME DATA | TONE DATA |
|---|---|---|---|---|
| CHANNEL 1 | ♫♫♫ | 1.0 | 1.0 | DRUM |
| CHANNEL 2 | ♫♫♫ | 1.0 | 1.0 | PIANO |
| CHANNEL 3 | ♫♫♫ | 1.0 | 1.0 | GUITAR |
| CHANNEL 4 | KA-CHING  BA-SH  KA-CHING | 1.0 | 1.0 | TONE A |
| CHANNEL 5 | YAHH!  SORA!  TORYA! | 1.12 | 1.15 | TONE C |

FIG. 7

| | FIRST GAME STAGE | SECOND GAME STAGE | THIRD GAME STAGE | FOURTH GAME STAGE | FIFTH GAME STAGE | SIXTH GAME STAGE |
|---|---|---|---|---|---|---|
| PITCH | 1.0 | 1.0 | 1.0 | 1.04 | 1.08 | 1.12 |
| VOLUME | 1.0 | 1.0 | 1.0 | 1.05 | 1.10 | 1.15 |

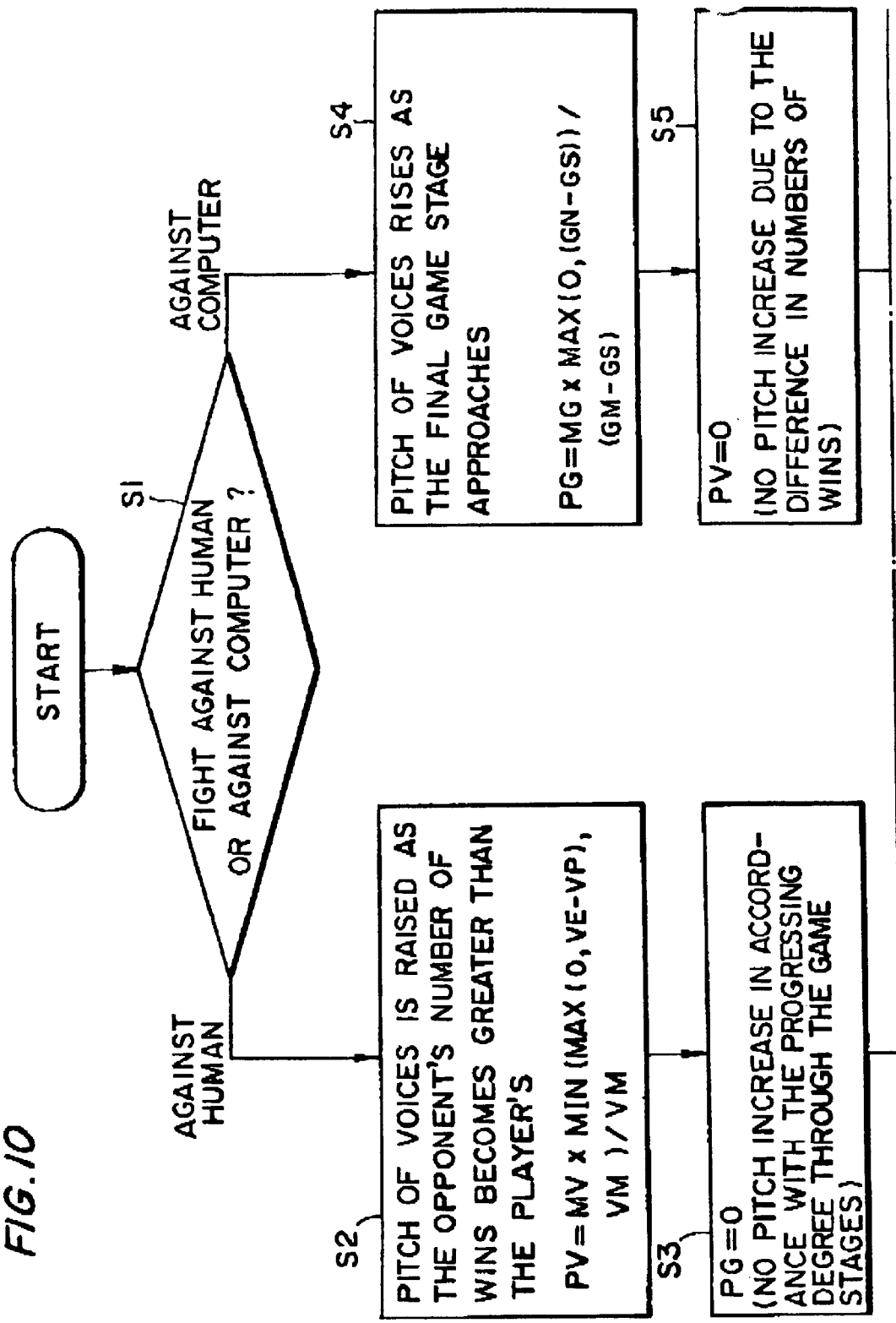

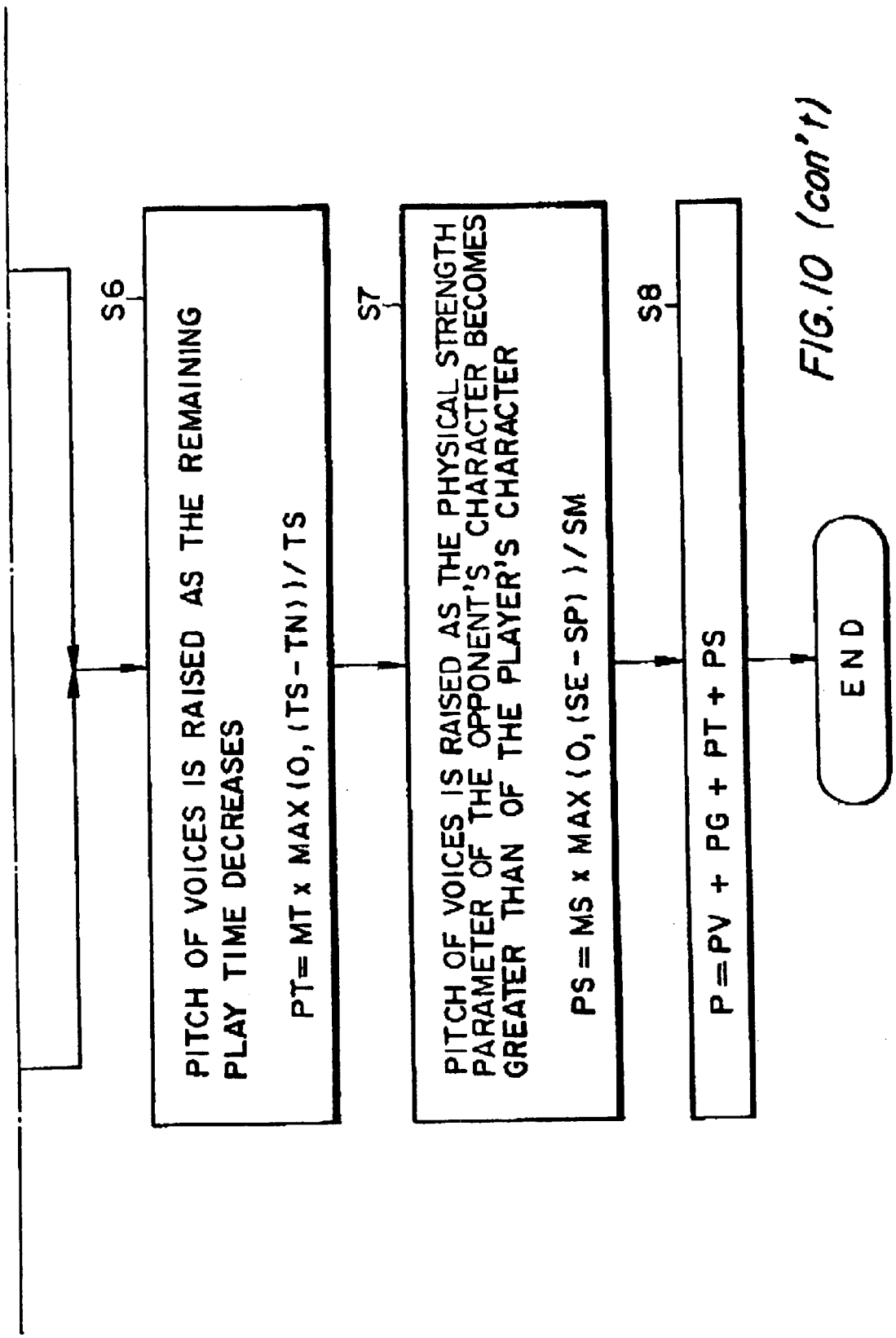
FIG. 10 (con't)

GAME MACHINE AND INFORMATION STORAGE MEDIUM

TECHNICAL FIELD

The present invention relates to a game machine that generates game images and game sounds, and an information storage medium.

BACKGROUND OF ART

In a game machine, the presentation of a game by game sounds such as voices, game music, and effects sounds plays a large role in increasing the interest, feeling of excitement, and realism of the game, so it is a subject of technical concern to determine how to present such game sounds effectively.

However, when a character that appears in the game is to sound a voice in a conventional game machine, waveform data of a voice is previously provided and it is always reproduced in the same manner. In other words, the pitch, volume, and tone of voices sounded by a character are always the same. For that reason, it is not possible to give the player a feeling of tension and to make the player excite by varying the voices of a character, and the effect of the game through game sounds is a bit unsatisfactory.

Note that prior-art techniques have been disclosed for varying voices and the like of characters in a stepwise manner, based on parameters, such as in Japanese Patent Application Laid-Open No. 10-33830, for example.

However, these prior-art techniques are directed towards single-player game machines, not multi-player game machines. There is therefore absolutely no reference to the concept of varying voices in accordance with the magnitude of a difference between status parameters of a character and another character.

These prior-art techniques also do not disclose the concept of increasing the pitch and volume of voices as the final game stage approaches, nor the concept of varying the voices when a given game stage is passed.

Furthermore, these prior-art techniques relate only to a simple way of switching the previously prepared voices of a child, for example, to the previously prepared voices of an adult, for example, and do not relate to the varying of the basic frequency and volume of voices from default values. They therefore have a problem in that it is not possible to vary the pitch and volume of voices subtly.

In addition, these prior-art techniques do disclose the concept of varying the voices of a character in accordance with a personality parameter of the character (changing a voice of a character with a large seriousness parameter to a serious-sounding voice and the voice of a character with a large mischievousness parameter to a mischievous-sounding voice), but they teach absolutely nothing about the concept of varying the pitch, volume, and tone of voices of a character in accordance with a factor such as the magnitude of a physical strength parameter of the character.

DISCLOSURE OF INVENTION

The present invention was devised in the light of the above described technical problems and has as an objective thereof the provision of a game machine and an information storage medium that make it possible to intensify the dramatic effect of a game by the voices sounded by a character.

In order to solve the above described technical problems, an aspect of the present invention relates to a game machine for generating a game image and a game sound, the game machine comprising: means for varying at least one of a pitch, volume, and tone of a voice sounded by a character that appears in a game, in accordance with at least one of a magnitude of a status parameter of the character and a magnitude of a difference between status parameters of the character and another character; means for generating a game image that comprises an image of the character; and means for generating a game sound that comprises a voice of the character, wherein the pitch of the voice sounded by the character is raised and the volume of the voice sounded by the character is increased as the magnitude of the difference between the status parameters of the character and the other character increases.

With this aspect of the invention, a status parameter such as a physical strength parameter may reflect by voices sounded by a character. This makes it possible to convey a change in the status of a character by varying the voices sounded by the character. As a result, the dramatic effect of the game can be greatly improved over a case in which status parameters are simply displayed as numerical values on the screen. It also makes it possible to increase the diversity of the game sounds that are represented.

With this aspect of the invention, it is possible to represent a state in which the character is nervous, when the status parameter of another character is greater than that of the player's character. Not only does this further increase the realism of the game, it also makes it possible to further intensify the feelings of excitement and tension of the character.

Another aspect of the present invention relates to a game machine for generating a game image and a game sound, the game machine comprising: means for varying at least one of a pitch, volume, and tone of a voice sounded by a character that appears in a game, in accordance with a magnitude of remaining play time; means for generating a game image that comprises an image of the character; and means for generating a game sound that comprises a voice of the character.

With this aspect of the present invention, it is possible to make voices sounded by a character is reflected by the magnitude of remaining play time. It is therefore possible to convey to the player that the time limit is close to expiring, using the voices sounded by the character, and thus greatly improve the dramatic effect of the game and the diversity of game sounds that can be represented.

In this aspect of the present invention, the pitch of the voice sounded by the character may be raised and the volume of the voice sounded by the character may be increased as the remaining play time decreases. This makes it possible to intensify the feelings of excitement and tension of the player as the time limit approaches, further increasing the interest of the game.

Furthermore, in this aspect of the present invention, at least one of the pitch, volume, and tone of a voice sounded by a character may be varied after the remaining play time has reached a given value. This makes it possible to convey to the player that the end of the game is close and the time limit is expiring, in a more effective manner.

A further aspect of the present invention relates to a game machine for generating a game image and a game sound, the game machine comprising: means for varying at least one of a pitch, volume, and tone of a voice sounded by a character that appears in a game, in accordance with a progressing degree through game stages; means for generating a game image that comprises an image of the character; and means for generating a game sound that comprises a voice of the character, wherein the pitch of the voice sounded by the character is raised and the volume of the voice sounded by the character is increased as a sequence of game stages through which a game is played approaches a final game stage.

With this aspect of the invention, the progressing degree through game stages can be reflected in voices sounded by the character. This makes it possible to use the voices sounded by the character to convey to the player that the final game stage is approaching, and thus greatly improve the dramatic effect of the game and the diversity of game sounds that can be represented.

Furthermore, this aspect of the invention makes it possible to intensify the feelings of excitement and tension of the player as the final game stage approaches, thus further increasing the interest of the game.

In this aspect of the present invention, at least one of the pitch, volume, and tone of a voice sounded by a character may be varied when a sequence of game stages through which a game is played has passed a given game stage. This makes it possible to convey the approach of the final game stage to the player in a more effective manner.

A still further aspect of the present invention relates to a game machine for generating a game image and a game sound, the game machine comprising: means for varying at least one of a pitch, volume, and tone of a voice sounded by a character that appears in a game, in accordance with at least one of a magnitude of a number of wins of a player and a magnitude of a difference between numbers of wins of the player and another player; means for generating a game image that comprises an image of the character; and means for generating a game sound that comprises a voice of the character.

With this aspect of the invention, the number of wins of the player can be reflected in voices sounded by the character. This makes it possible to reflect the superiority and inferiority in game skills of the players in the characters manipulated by the players, and thus greatly improve the dramatic effect of the game and the diversity of game sounds that can be represented.

In this aspect of the present invention, the pitch or volume of a voice sounded by a character may be increased as the difference between the numbers of wins of the player and the other player increases. This makes it possible to increase the realism of a game by enabling the expression of a state in which a character is nervous at the prospect of fighting a superior player.

Furthermore, in this aspect of the present invention, an increase in the pitch of a voice sounded by the character may be a whole tone or less. This makes it possible to act on the subconsciousness of the player and thus increase the player's feelings of excitement and tension.

A yet further aspect of the present invention relates to a game machine for generating a game image and a game sound, the game machine comprising: means for varying at least one of the basic frequency and volume of a voice sounded by a character that appears in the game, from a default value, in accordance with at least one of a magnitude of a status parameter of the character and a magnitude of a difference between status parameters of the character and another character; means for generating a game image that comprises an image of the character; and means for generating a game sound that comprises a voice of the character. In yet another aspect of the present invention, at least one of the basic frequency and volume of a voice sounded by a character that appears in the game may be varied from a default value, in accordance with a progressing degree through game stages.

With this aspect of the invention, the basic frequency and volume of voices are varied from default values in accordance with the magnitude of a status parameter, the magnitude of the difference between the status parameters of this character and another character, or the progressing degree through the game stages (in other words, effects can be applied on one voice to vary the voice, by way of example). It is therefore possible to vary the pitch and volume of voices, not in a large manner but subtly. As a result, it is possible to act on the subconsciousness of the player and thus increase the player's feelings of excitement and tension, while avoiding a state which seems unnatural to the player.

Still another aspect of the present invention relates to a game machine for generating a game image and a game sound, the game machine comprising: means for varying at least one of a pitch, volume, and tone of a voice sounded by a character that appears in a game, in accordance with at least one of a magnitude of a physical strength parameter of a character and a magnitude of a difference between physical strength parameters of the character and another character; means for generating a game image that comprises an image of the character; and means for generating a game sound that comprises a voice of the character.

With this aspect of the present invention, the magnitude of a physical strength parameter or the magnitude of the difference between physical strength parameters of a character and another character can be conveyed to the player by variations in the pitch, volume, or tone of voices of the character. It is therefore possible to act on the subconsciousness of the player to convey the magnitude of the current physical strength parameter of the character, while the player is immersed in the game, with eyes fixed on the motions of the character, without having to pay attentions to visual clues such as a physical strength gauge. This makes it possible to induce feelings of excitement and tension in the player that have not been possible up to now.

BRIEF DESCRIPTION OF DRAWINGS

FIG. 3 illustrates sequence data;

FIG. 4 also illustrates sequence data;

FIG. 7 illustrates the adjustment of the pitch and volume of voices in accordance with the progressing degree through the game stages;

FIG. 10 is a flowchart illustrating details of a processing example of the present embodiment;

BEST MODE FOR CARRYING OUT THE INVENTION

A preferred embodiment of the present invention is described below with reference to the accompanying drawings. Note that the description below relates to an example in which the present invention is applied to a fighting game, but the applications of the present invention are not limited thereto. The present invention is also not limited to a three-dimensional game and it can equally well be applied to a two-dimensional game.

Figure 1:
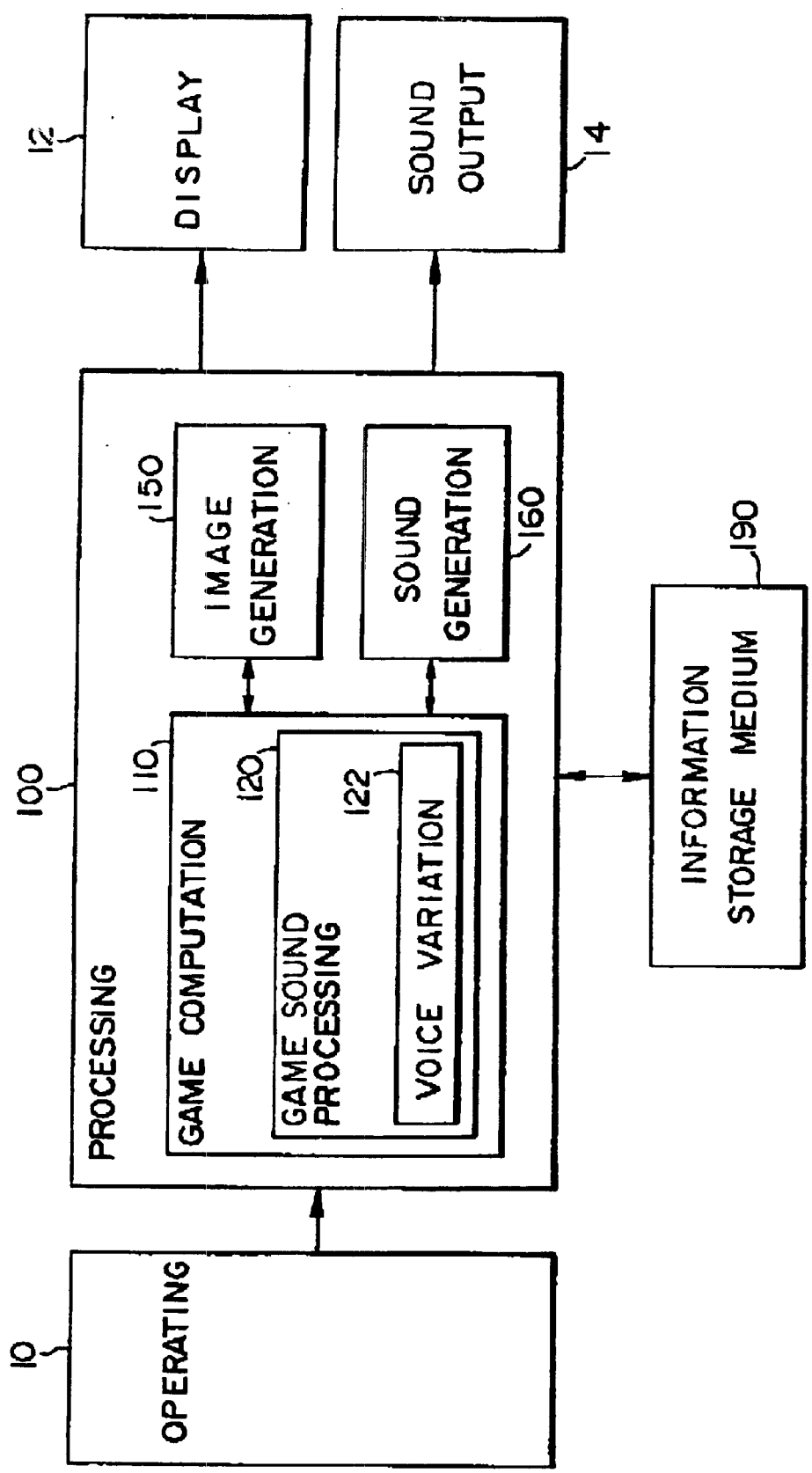
FIG. 1 shows an example of a functional block diagram of the present embodiment.

A typical functional block diagram of the present embodiment is shown in FIG. 1. In the present embodiment, an operating section 10 allows a player to input operation data by operating a joystick, buttons, a steering wheel, an accelerator, and the like, and operation data that has been obtained by the operating section 10 is input to a processing section 100.

The processing section 100 performs processing such as that of setting game sounds, disposing objects within the object space, and of creating an image as seen from a given viewpoint in the object space, based on the above described operation data, a given program, and the like. The functions of the processing section 100 could be implemented by hardware such as a CPU (either CISC or RISC), a DSP, an ASIC (such as a gate array), or memory.

An information storage medium 190 stores programs and data. The functions of this information storage medium 190 can be implemented by hardware such as a CD-ROM, game cassette, IC card, magneto-optical disk, floppy disk, digital video disk, hard disk, or ROM. The processing section 100 performs the various kinds of processing thereof based on programs and data from the information storage medium 190.

The processing section 100 comprises a game computation section 110, an image generation section 150, and a sound generation section 160.

In this case, the game computation section 110 performs the various processing such as setting the game mode, computing various status parameters of the characters, computing the remaining play time, moving the game stage forward, computing the number of wins (successive wins), determining the position and direction of moving bodies such as characters, determining the viewpoint position and line-of-sight direction, and disposing objects within the object space.

The image generation section 150 performs processing to create an image at a given viewpoint within the object space as set by the game computation section 110. The image produced by the image generation section 150 is displayed on a display section 12.

The sound generation section 160 performs processing for generating game sounds (such as game music, effect sounds, and voices) in accordance with instructions from the game computation section 110. The game sounds created by the sound generation section 160 are output by a sound output section 14.

The game computation section 110 comprises a game sound processing section 120.

In this case, the game sound processing section 120 performs the various processing for generating the game sounds, and the sound generation section 160 creates the game sounds in accordance with instructions from this game sound processing section 120. The game sound processing section 120 comprises a voice variation section 122.

A first characteristic of the present embodiment is that the voice variation section 122 performs processing to modify the pitch, volume, or tone of a voice sounded by a character in accordance with the magnitude of a status parameter of the character or the magnitude of the difference between the status parameters of this character and another character.

Figure 2:
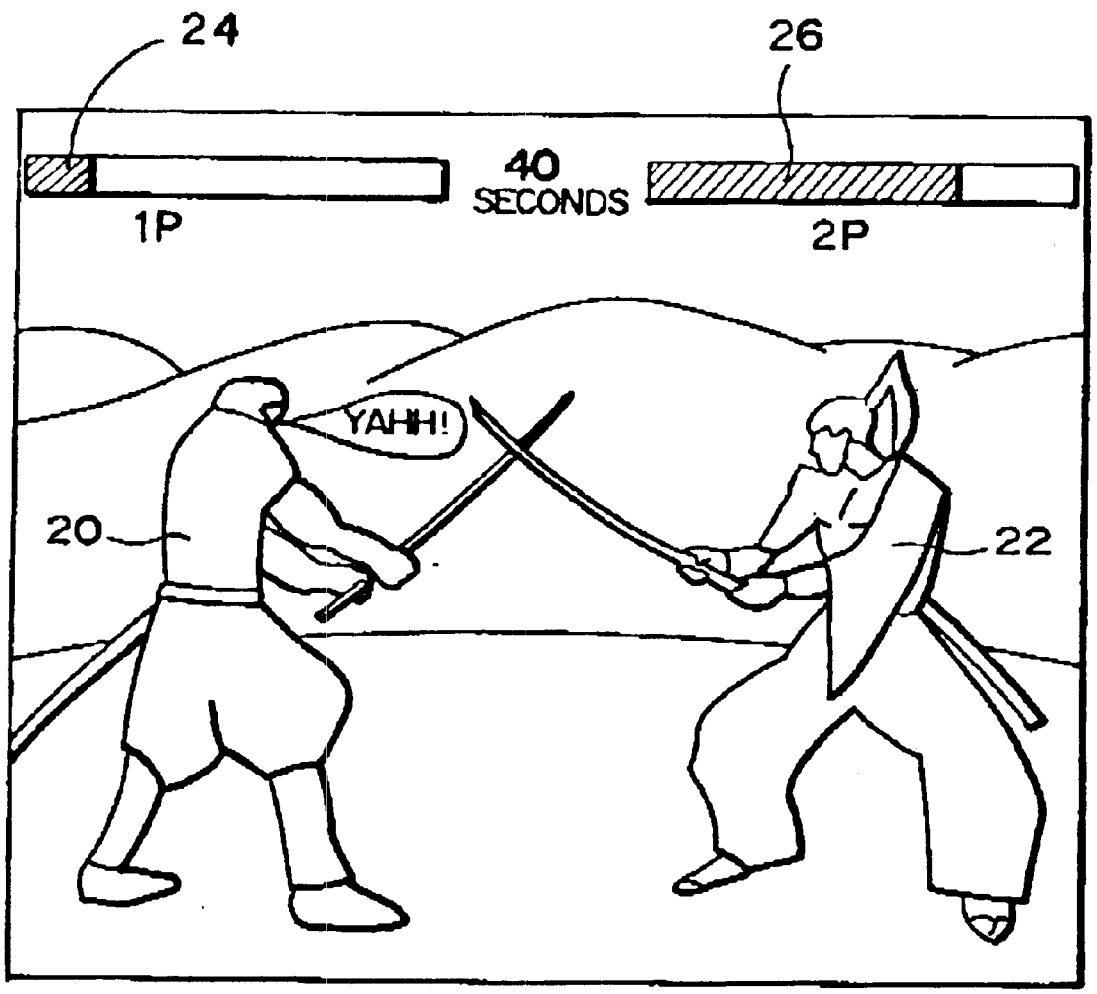
FIG. 2 shows an example of a game image generated by the present embodiment, illustrating how the pitch and volume of a voice is adjusted in accordance with the physical strength parameter.

An example of a game image generated by the present embodiment is shown in FIG. 2. In FIG. 2, a character 20 manipulated by a player (1P player) and a character 22 manipulated by another player (2P player) are fighting. A physical strength parameter of the character 22 is greater than a physical strength parameter of the character 20, as indicated by physical strength gauges 24 and 26. In other words, the character 20 has fallen into a disadvantaged state, leading to a state in which the game is close to being over. In such a case, the present embodiment subtly increases the pitch of a voice (a shout of self-encouragement, etc) produced by the character 20, and also subtly increases the volume thereof. This setup makes it possible to represent the excitement and tension of the character 20 facing an ultimate situation. Not only does this make it possible to greatly increase the player's feelings of excitement and tension, and also immersion in the game, it also makes it possible to further increase the absorption of the player in the player's own character.

In particular, the present embodiment does not cause a large variation in the pitch or volume of a voice but instead causes a subtle variation therein (by, for example, increasing the pitch by not more than a whole tone, as described later). This makes it possible to avoid a state which seems unnatural to the player and also makes it possible to act on the subconsciousness of the player and thus increase the player's feelings of excitement and tension.

Note that FIG. 2 was described as relating to a case in which the status parameter is a physical strength parameter. However, various other parameters could equally well be considered as this status parameter, such as an endurance parameter, a resistance power parameter, a defensive power parameter, a fighting power parameter, a weapons (missiles, shots, etc) possession parameter, an attacking power parameter, a hit points parameter, a magic points parameter, or an item (such as money) possession parameter.

In order to indicate to the sound generation section 160 which sounds to generate, the game sound processing section 120 sends sequence data, in the format shown in FIG. 3, to the sound generation section 160. This sequence data comprises music score data, pitch data, volume data, and tone data. In this case, music score data specifies the melody and rhythm of game sounds to be output by each channel. Pitch data, volume data, and tone data are data for adjusting the pitch, volume, and tone of game sounds that are output from each channel.

As specified by the sequence data of FIG. 3, game music having the tone of drums, piano, and guitar is output from channels 1, 2, and 3 in accordance with the music score data. Special effects sounds (tone A) representing sounds such as those of weapons clashing against each other are output from channel 4 in accordance with the music score data. Voices (tone B) sounded by the character are output from channel 5 in accordance with the music score data.

In the sequence data of FIG. 3, pitch data and volume data of the game music (channels 1, 2, and 3), effects sounds (channel 4), and voices sounded by the character (channel 5) are initially set to 1.0. Setting the pitch data and volume data to 1.0 in this manner ensures that the pitch and volume of game music, effect sounds, and voices do not vary from their default values.

In contrast thereto, the pitch data of voices sounded by the character (channel 5) is set to 1.12 in the sequence data of FIG. 4, and the volume data thereof is set to 1.15. Setting the values in this manner ensures that the basic frequency (equivalent to pitch) of voices sounded by the character is 1.12 times the default value, and the volume thereof is 1.15 times the default value. In other words, if the game sound processing section 120 sends the sequence data of FIG. 4 to the sound generation section 160, the sound generation section 160 generates sounds such that the basic frequency (pitch) and volume of voices sounded by the character are 1.12 and 1.15 times the default values, respectively. In the thus-configured embodiment, the pitch and volume of a voice sounded by a character are adjusted by adjusting the pitch data and volume data in the sequence data.

Note that the values of pitch data and volume data could be determined by the magnitude of a physical strength parameter (status parameter) of the character or by the magnitude of the difference between the physical strength parameters of the character and the opposing character. For example, if the configuration is such that pitch rises and volume increases as the difference between physical strength parameters increases, it will appear that the pitch and volume of voices of the character increase as the situation becomes against the character. This makes it possible to further increase the dramatic effect of the game, by intensifying the feeling of excitement and degree of strain of the player.

The voices sounded by the character are set in tone B in the sequence data of FIG. 3, whereas they are set as tone C in the sequence data of FIG. 4. In this case, a tone for voices sounded by the character when tense (such as a tone for nervous voices) is provided as tone C. Such a configuration makes it possible to convey to the player that the character is in a nervous state, thus intensifying the feelings of excitement and tension of the player.

A second characteristic of the present invention is that the voice variation section 122 causes the pitch, volume, or tone of voices sounded by a character to vary in accordance with the remaining play time.

Figure 5:
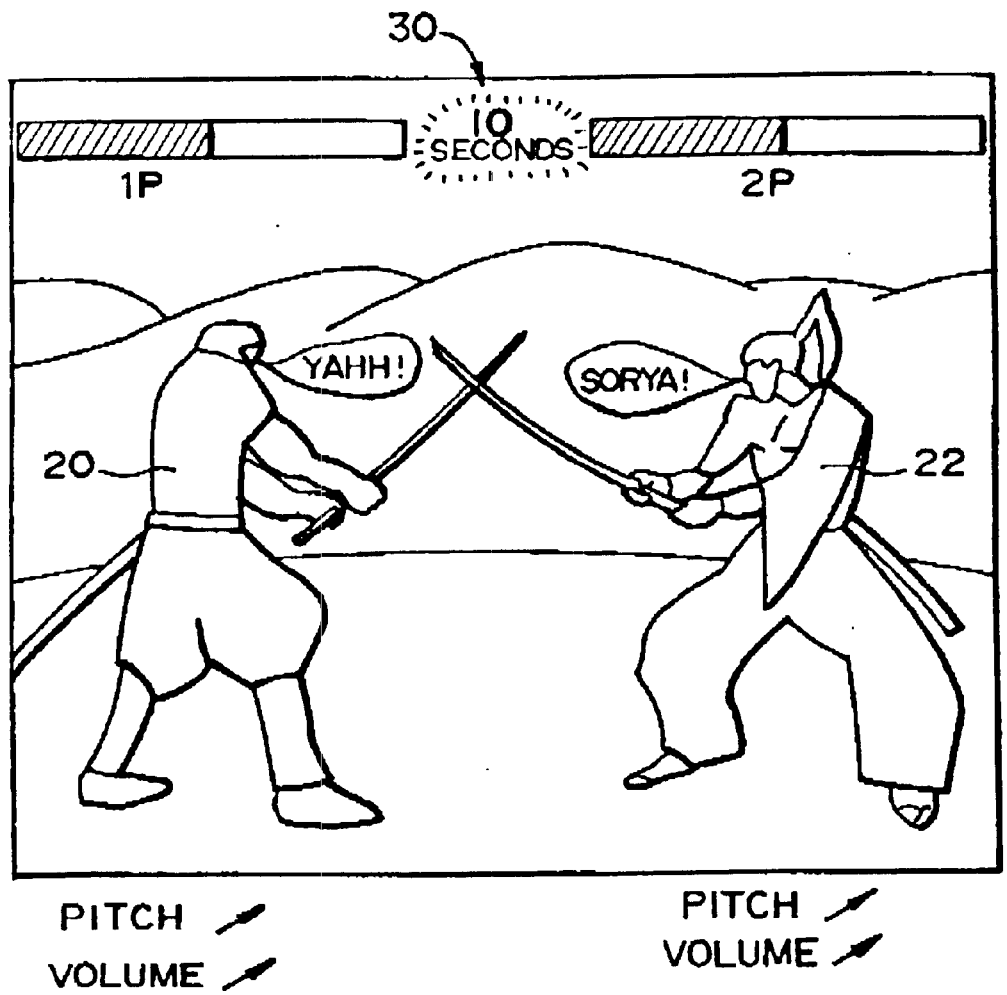
FIG. 5 shows another example of a game image generated by the present embodiment, illustrating how the pitch and volume of voices are adjusted in accordance with remaining play time.

In other words, when the remaining play time is 10 seconds, as indicated by a remaining play time display 30 shown in FIG. 5, the game is approaching its end. In the present embodiment, the pitch of voices of the characters 20 and 22 subtly rises and the volume thereof subtly increases as the remaining play time decreases. This makes it possible to act on the subconsciousness of the player and convey the fact that the time limit is approaching and the contest is close to ending. Subtly varying the pitch and volume of voices in this manner gives the player a subconscious feeling that the time limit is approaching, without having to look at the remaining play time display 30. As a result, the feelings of excitement and tension of the player can be intensified just before the end of the game, making it possible to increase the interest and charm of the game even further.

Note that the pitch of a voice sounded by a character is preferably raised gradually as the remaining play time decreases. Similarly, the volume of voices sounded by the character is preferably increased gradually as the remaining play time decreases. Such a configuration makes it possible to implement the dramatic effect of the game more effectively, by gradually intensifying the feelings of excitement and tension of the player as the end of the game approaches.

The pitch, volume, and tone of voices sounded by the character are preferably set in such a manner as to vary after the remaining play time reaches a given value. For example, in FIG. 6 the pitch and volume do not vary when the remaining play time is between 60 seconds and 20 seconds. In other words, the pitch data and volume data are set to 1.0 (see FIG. 3). After the remaining play time reaches 20 seconds, the pitch starts to rise gradually and the volume starts to increase gradually. In other words, after the remaining play time reaches 20 seconds, the pitch data starts to vary gradually from 1.0 until it finally reaches 1.12, for example, and the volume data starts to vary gradually from 1.0 until it finally reaches 1.15, for example (see FIG. 4). This configuration makes it possible to convey to the player more effectively that the end of the game is close and the time limit is approaching. In other words, since the pitch rises and the volume increases within a short period just before the end of the game (between 20 seconds and 0 seconds in FIG. 6), the feelings of tension and excitement of the player can be intensified in an effective manner towards the end of the game.

A third characteristic of the present invention is that the voice variation section 122 of FIG. 1 causes the pitch, volume, or tone of voices sounded by a character to vary in accordance with the progressing degree through game stages.

For example, the pitch of voices sounded by the character rises and the volume thereof increases as the player approaches a final game stage within a sequence of game stages through which the game is played, as shown in FIG. 7. Alternatively, the tone of the voices of a character is varied to represent the tone of a state in which the character is tense (such as a tone for nervous voices or for quavering voices). This configuration makes it possible to act on the subconsciousness of the player to convey that the final game stage is approaching and a final boss will soon appear. Thus the feelings of excitement and tension of the player can be intensified as the game stages progress, making it possible to stimulate the player into playing the game up to the final game stage. As a result, it is possible to provide a game that players are unlikely to become sick of playing, and also increase the usage ratio of game machines in game facilities or the like.

Note that it is preferable that the pitch, volume, and tone of voices sounded by a character are varies after a given game stage has been achieved. For example, the pitch and tone do not vary in first, second, and third game stages in FIG. 7. In other words, the pitch data and volume data are both set to 1.0 (see FIG. 3). From the fourth game stage, the pitch data starts to vary gradually from 1.0 until it finally reaches 1.12, for example, and the volume data starts to vary gradually from 1.0 until it finally reaches 1.15, for example. This makes it possible to convey to the player more effectively that combat with a final boss is approaching.

A fourth characteristic of the present invention is that the voice variation section 122 of FIG. 1 causes the pitch, volume, or tone of voices sounded by a character to vary in accordance with the magnitude of the number of wins of the player or the magnitude in the difference between the numbers of wins of the player and another player.

Figure 8:
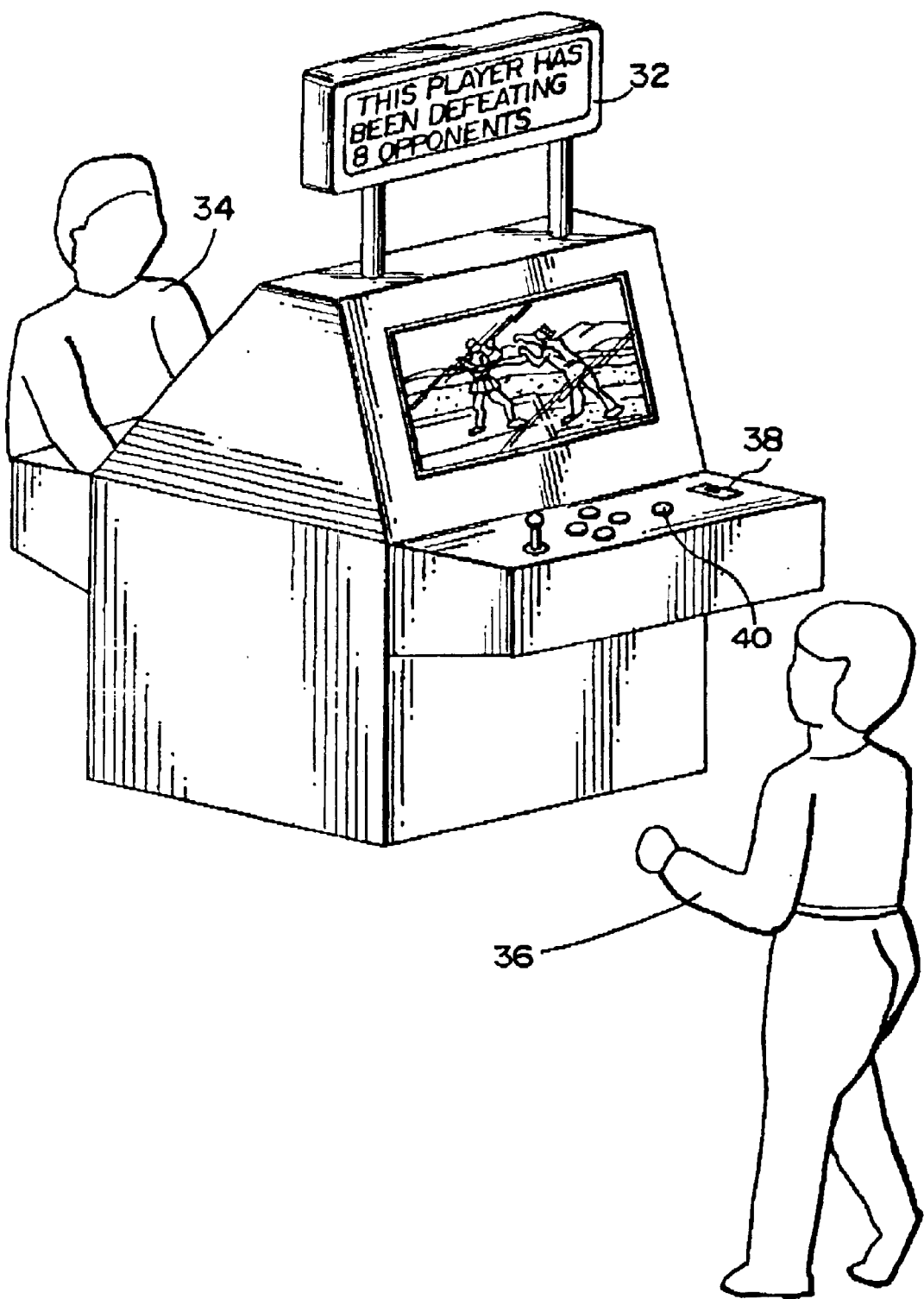
FIG. 8 illustrates the adjustment of the pitch and volume of voices in accordance with the number of wins.

In an example shown in FIG. 8, "This player has been defeating 8 opponents" is displayed on a display panel 32. This means that a player 34 is consecutively winning 8 games against other players. Another player 36 is attempting to challenge the player 34. To challenge the player 34, the player 36 could insert a coin into a coin slot 38 and press a start button 40 while the player 34 is playing the game. Thereupon, the character manipulated by the player 34 fights against another character manipulated by the player 36. If the player 34 wins this fight, "This player has been defeating 9 opponents" is displayed on the display panel 32.

In the present embodiment, the pitch of voices sounded by a character rises and the volume thereof increases as the difference between the numbers of wins of the player and another player increases. In the example shown in FIG. 8, the number of wins of the player 34 is eight and the number of wins of the player 36 is zero, so the difference therebetween is eight. Therefore the player 34 could be considered to have the higher rank and the player 36 have the lower rank. In this case, the configuration is such that the pitch of voices of the character of the player 36, who is in the lower rank, is raised and the volume thereof is increased, to represent a state in which the character of the player 36 is nervous at challenging the higher ranking. This not only makes it possible to increase the realism of the game, it also makes it possible to further increase the absorption of the player in a player's character.

Note that, instead of varying the pitch and volume of the voices of a character, it is also possible to vary the tone of the voices of the character to represent the tone of the state in which the character is nervous (such as a tone for nervous voices or for quavering voices).

A firth characteristic of the present invention is that the increase in pitch of a voice sounded by a character is not more than a whole tone (frequency ratio: $2^{2/12}=1.122$ times).

Figure 9:
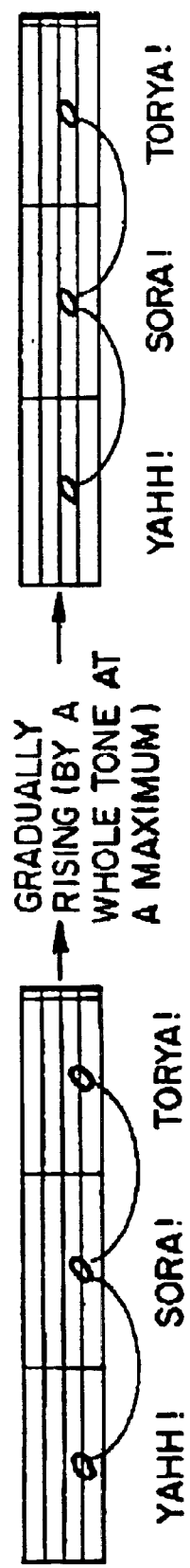
FIG. 9 illustrates a method of setting the increase in the pitch of voices to not more than a whole tone.

In an example shown in FIG. 9, the pitch of voices (the basic frequency of voices) gradually rises (subtly varies) from "So (G)" in accordance with a factor such as the physical strength parameter, remaining play time, progressing degree through game stages, or number of wins. In this case, the maximum pitch of voices in the present embodiment is "La (A)". In other words, the difference between the maximum value of pitch "La" and the minimum value "So" is not more than a whole tone. This makes it possible to prevent a state in which the variation of voices seems unnatural to the player.

In other words, if the increase in pitch is greater than a whole tone, the player will notice that the voices have clearly changed, rather than considering that the voice seems nervous. If the increase in pitch in accordance with the present embodiment is not more than a whole tone and thus the pitch is varied gradually, on the other hand, the player will not be aware of the change of pitch, making it possible to act on the subconsciousness of the player and thus increase the player's feelings of excitement and tension.

In addition, if the sampling frequency of waveform data in which the pitch is "So" when recorded were to be varied to generate voices in which the pitch is "Si (H)" or "Do (C)", such voices would be extremely harsh to the ears of the player. If waveform data in which the pitch is "Si" or "Do" is also prepared during recording, in order to prevent this, a large capacity of memory is required for storing this waveform data, the hardware becomes larger, and thus this game machine becomes more expensive. If the method of the present embodiment is used in which the increase in pitch is not more than a whole tone, on the other hand, only waveform data based on "So" need to be provided, and it is therefore possible to provide a smaller hardware package in that voices do not seem unnatural to the player, even if the pitch is varied.

Note that the maximum value of the increase in pitch of voices is preferably different for each character, in accordance with the sex and other features of the character. In some cases, it is possible to set the increase in pitch of voices to be not more than a major third (two whole tones, frequency ratio: $2^{4/12}=1.260$ times).

A detailed example of the processing of the present embodiment will now be described with reference to the flowchart of FIG. 10.

Note that in FIG. 10:

PV: Increase in pitch set by difference between the number of wins

PG: Increase in pitch set by progressing degree through game stages

PT: Increase in pitch set by remaining play time

PS: Increase in pitch set by physical strength parameter

P: Increase in pitch of voices sounded by a character

The increase in pitch P of voices sounded by a character is the sum of the above described PV, PG, PT, and PS.

First of all, a decision is made as to whether this is fight against a human (player vs. player) or against the computer (player vs. computer) (step s1). When the player is fighting against a human, the processing raises the pitch of voices as the opponent's number of wins becomes greater (as the opponent becomes the higher ranking) (step s2, FIG. 10, ex. see FIG. 8). More specifically, the increase in pitch in accordance with the difference between the numbers of wins (PV) is obtained from Equation (1), as follows:

$$PV=MV \times MIN(MAX(0,VE-VP),VM)/VM \quad (1)$$

where:

MV: Maximum value of PV

VE: Opponent's number of wins

VP: Player's own number of wins

VM: Maximum value of difference between numbers of wins

According to Equation (1), if VE−VP≦0, MAX (0, VE−VP)=0 and thus PV=MIN (0, VM)/VM=0. In other words, if the player's character is higher ranking than the opponent's character, the pitch increase PV due to the difference between the numbers of wins is zero.

If VE−VP=VM, MAX (0, VE−VP)=VE−VP=VM and PV=MV×MIN (VM, VM)/VM=MV. In other words, if VE−VP=VM, PV is set to the maximum value MV; if VE−VP>VM, PV cannot become greater than MV.

Note that when the player is fighting against a human, PG=0 (step S3) and there is no increase in pitch as the progressing degree through game stages.

If it is determined in step s1 that the player is fighting against the computer, processing is done to raise the pitch of voices as the final game stage approaches (step s4, FIG. 10, ex. see FIG. 7). More specifically, the increase in pitch in accordance with the progressing degree through the game stages (PG) is obtained from Equation (2), as follows:

$$PG=MG \times MAX(0,(GN-GS))/(GM-GS) \quad (2)$$

where:

MG: Maximum value of PG

GN: Number of current game stage

GS: Number of game stage just before the pitch starts rising (the pitch starts rising after GS is passed)

GM: Number of final game stage

According to Equation (2), if GN≦GS<0, MAX (0, (GN−GS))=0 and thus PG=0. In other words, if GN is not greater than GS (if GN has not exceed GS), the increase in pitch in accordance with the progressing degree through the game stages (PG) is zero.

If GN=GM, MAX (0, GN−GS)=GM−GS and PG=MG. In other words, if GN=GM (if the game is in the final stage) PG is set to the maximum value MG.

Note that when the player is fighting against the computer, PV=0 (step S5) and thus there is no increase in pitch due to the difference in numbers of wins.

Figure 6:
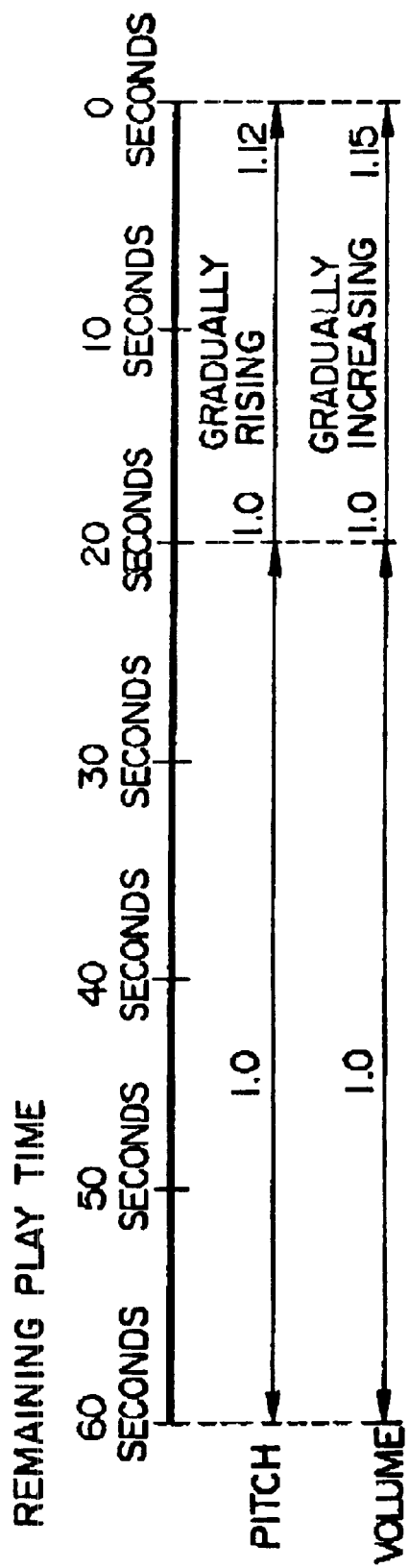
FIG. 6 illustrates a method of raising the pitch and increasing the volume after the remaining play time has reached a given value.

Processing to raise the pitch of voices as the remaining play time decreases is performed (step s6, FIG. 10, ex. see FIGS. 5 and 6). More specifically, the increase in pitch in accordance with the remaining play time (PT) is obtained from Equation (3), as follows:

$$PT=MT \times MAX(0, (TS-TN))/TS \tag{3}$$

where:
MT: Maximum value of PT
TN: Current remaining play time
TS: Remaining play time just before the pitch starts rising (the pitch starts rising after TS is exceeded)

According to Equation (3), if TS−TN≦0, MAX (0, (TS−TN))=0 and thus PT=0. In other words, if TN is not greater than TS (if TS has not been exceeded), the increase in pitch in accordance with the remaining play time (PT) is zero.

If TN=0, MAX (0, TS−TN)=TS and thus PT=MT. In other words, if TN=0 (the time limit has expired), PT is set to the maximum value MT.

Processing is then done to raise the pitch of voices as the opponent's character's physical strength parameter becomes greater than that of the player's character (step S7, see FIG. 2). More specifically, the increase in pitch in accordance with the difference in physical strength parameters (PS) is obtained from Equation (4), as follows:

$$PS=MS \times MAX(0, (SE-SP))/SM \tag{4}$$

where:
MS: Maximum value of PS
SE: Physical strength parameter of the opponent's character
SP: Physical strength parameter of the player's character
SM: Maximum value of difference in physical strength parameters According to Equation (4), if SE−SP≦0, MAX (0, (SE−SP))=0 and thus PS=0. In other words, if SE is not greater than SP (if the physical strength parameter of the opponent's character is not greater than the physical strength parameter of the player's character), the increase in pitch in accordance with the difference in physical strength parameters (PS) is zero.

If SE−SP=SM, MAX (0, SE−SP)=SE−SP=SM and thus PS=MS. In other words, if SE−SP=SM (if the difference in physical strength parameters is at the maximum value SM), PS is set to the maximum value MS.

The total increase in pitch P of voices sounded by the character is then obtained based on the values of PV, PG, PT and PS obtained in steps S2 to S7, as shown in Equation (5) below (step S8).

$$P=PV+PG+PT+PS \tag{5}$$

Note that if the increase in pitch P of voices sounded by the character is set to be not more than a whole tone and the setting for a raising by only a whole tone is 100, the maximum values MV, MG, MT, and MS may be set to satisfy either Equation (6) or (7), as follows:

$$MV+MT+MS \leq 100 \text{(when fighting against a human)} \tag{6}$$

$$MG+MT+MS \leq 100 \text{(when fighting against a computer)} \tag{7}$$

Note that FIG. 10 is a flowchart of the processing involved with calculating the increase in pitch of voices, but a similar flowchart could be created for the processing required for increasing the volume of voices.

Figure 11:
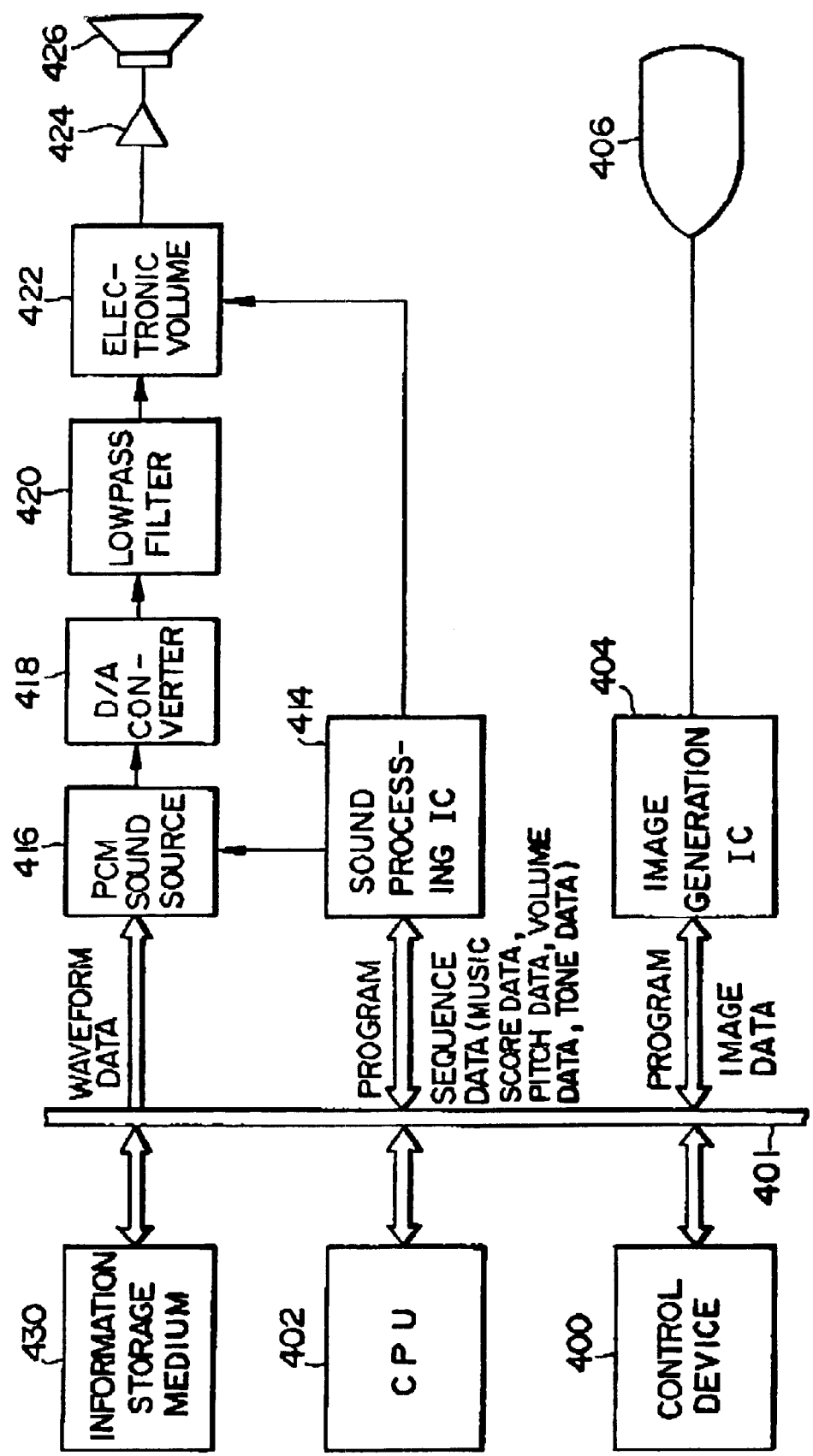
FIG. 11 shows an example of a hardware configuration capable of implementing the present embodiment.

The description now turns to an example of hardware that can implement the present embodiment, with reference to FIG. 11.

An information storage medium 430 is mainly used for storing a program, image data, sound data (waveform data and sequence data) and the like. Means such as a CD-ROM, DVD, or game cassette could be used as the information storage medium for storing a game program and the like for a domestic game machine; memory such as ROM could be used for an arcade game machine.

A control device 400 is equivalent to a game controller or operating panel and it is used as a device for inputting into the main unit the results of decisions made by the player as the game progresses.

A CPU 402 controls the entire apparatus and performs various data processing and game computation processing in accordance with a program and data stored in the information storage medium 430 and signals input through the control device 400. Note that data read from the information storage medium 430 is stored temporarily in RAM or other storage means (not shown in the figure). This RAM is also used as a work area of the CPU 402, an image generation IC 404, and a sound processing IC 414.

This game machine is provided with the image generation IC 404 and the sound processing IC 414 and is configured in such a manner that it outputs sounds and images as appropriate. ASICs or the like could be used for such the image generation IC 404 and the sound processing IC 414.

The image generation IC 404 is an integrated circuit that generates pixel information for outputting to a display 406, based on image information that is sent from components such as the RAM (not shown) and the information storage medium 430. Note that a device called a head-mounted display (HMD) could also be used as the display 406.

The sound processing IC 414 performs the various processes required for generating game sounds such as game music, effects sounds, and voices, based on instructions from the CPU 402 and a program and sequence data (music score data, pitch data, volume data, tone data) from the RAM and the information storage medium 430. A PCM sound source 416 generates a digital signal of sounds that are to be output, based on the processing results of the sound processing IC 414 and the waveform data (data representing the actual waveforms of the drums, piano, guitar, effects sounds, and voices) from the information storage medium 430, and outputs them to a D/A converter 418. The D/A converter 418 converts this digital signal into an analog signal and outputs it to a lowpass filter 420. An output of the lowpass filter 420 is input to an electronic volume 422. The electronic volume 422 adjusts the volume in accordance with instructions from the sound processing IC 414. An output of the electronic volume 422 is input to a speaker 426 through an amplifier 424, and sounds such as game music, effects sounds, and voices are output therefrom to the outside.

The processing described with reference to FIGS. 1 to 9 is implemented by components such the information storage medium 430 that stores a program for performing processing such as that shown in the flowchart of FIG. 10, the CPU 402 that operates in accordance with that program, the image generation IC 404, and a sound generation IC 414. Note that the processing performed by the image generation IC 404 and the sound generation IC 414 could be performed in a software manner by means such as the CPU 402 or a general-purpose DSP.

Figure 12A:
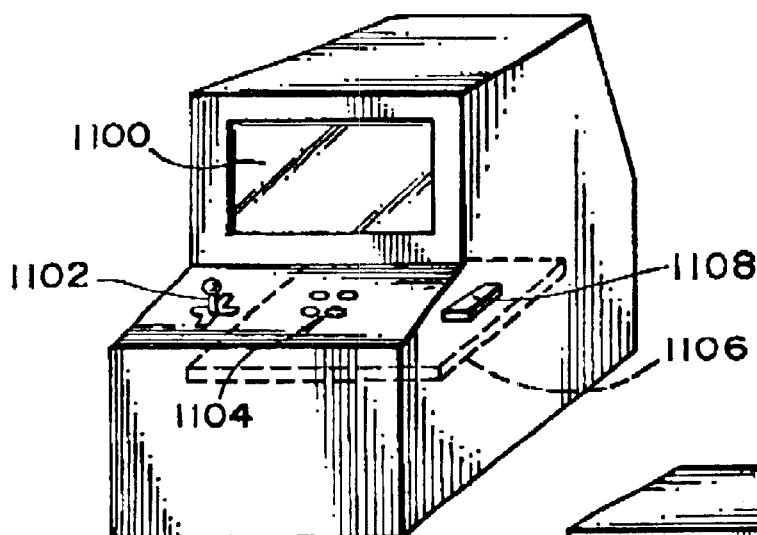
FIGS. 12A, 12B, and 12C show examples of various types of apparatus to which the present embodiment is applied.

An example of the present embodiment applied to an arcade game machine is shown in FIG. 12A. The player enjoys the game by operating a joystick 1102 and buttons 1104 while viewing a game image shown on a display 1100. Components such as a CPU, an image generation IC, and a sound processing IC are mounted on an IC board 1106 incorporated into the game machine. Information is stored in a memory 1108, which is an information storage medium on the IC board 1106. This information includes information for varying at least one of the pitch, volume, and tone of a voice sounded by a character that appears in a game, in accordance with the magnitude of a status parameter of a character, the magnitude of the difference between the status parameters of a character and another character, the magnitude of the remaining play time, the progressing degree through game stages, the magnitude of the number of wins of the player, or the magnitude of the difference between the numbers of wins of the player and another player; information for generating game images that comprise an image of a character; and information for generating game sounds that comprise a voice of a character. This information is hereinafter called stored information. This stored information comprises at least one type of information, such as program coding for performing the above described various processings, image information, sound information, shape information for display objects, table data, list data, or player information.

Figure 12B:
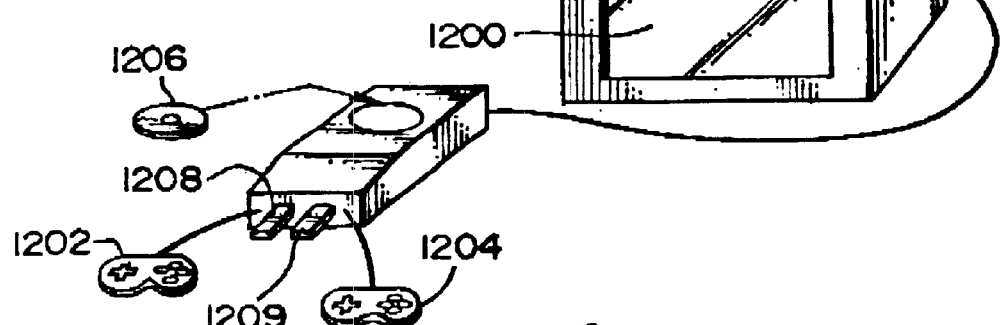

An example of the present embodiment applied to a domestic game machine is shown in FIG. 12B. Players enjoy the game by manipulating game controllers 1202 and 1204 while viewing. a game image shown on a display 1200. In this case, the above described stored information is stored in a CD-ROM 1206 or IC cards 1208 and 1209, which are information storage media that can be freely inserted into and removed from the main unit.

Figure 12C:
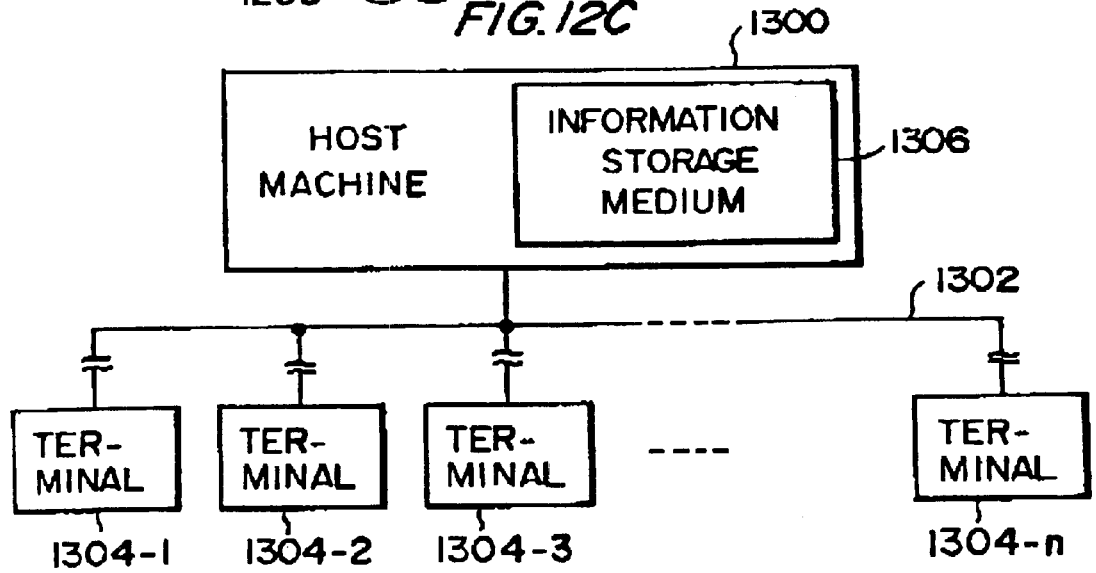

An example of the present embodiment applied to a game machine is shown in FIG. 12C where the game machine comprises a host machine 1300 and terminals 1304-1 to 1304-n connected to the host machine 1300 by communication lines 1302. In this case, the above described stored information is stored in an information storage medium 1306 such as a magnetic disk device, magnetic tape device, or memory that can be controlled by the host machine 1300. Each of the terminals 1304-1 to 1304-n has a CPU, an image generation IC, and a sound processing IC. In addition, if game images and sounds can be generated thereby in a stand-alone manner, a game program or the like for generating game images and sounds is transferred to the terminals 1304-1 to 1304-n from the host machine 1300. On the other hand, if they cannot be generated in a stand-alone manner, the host machine 1300 generate the game images and sounds then transfers them to the terminals 1304-1 to 1304-n for output by those terminals.

Note that the present invention is not limited to the above described embodiments and it can be modified in various ways.

For example, the processing required for varying the pitch, volume, or tone of voices is not limited to that described in the present embodiment of the invention, and thus it can be modified in many various ways.

The present embodiment was described as relating to a case in which the pitch of voices rises and the volume thereof increases when a given condition is satisfied. However, it is equally possible to lower the pitch of voices and reduce the volume thereof when a given condition is satisfied.

Although the increase in pitch is preferably limited to not more than a whole tone, the increase in pitch could also be greater than a whole tone.

Other than a fighting game, the present invention can also be applied to other games, such as a robot-battling game. In addition, the characters represented in the present invention are not limited to human beings and thus the present invention can be applied to various other characters (such as robots) that appear in a game.

The present invention is also not limited to domestic and arcade game machines; it can be applied to various other image generation devices such as simulators, large-scale attraction devices in which many players can participate, personal computers, multimedia terminals, and system boards that generate game images.

What is claimed is:

1. A game machine for generating a game image and a game sound, said game machine comprising:

means for varying at least one of a pitch, volume, and tone of a voice sounded by a character that appears in a game, in accordance with at least one of a magnitude of a status parameter of the character and a magnitude of a difference between status parameters of the character and another character;

means for generating a game image that comprises an image of the character; and means for generating a game sound that comprises a voice of the character, wherein the pitch of the voice sounded by the character is raised and the volume of the voice sounded by the character is increased as the magnitude of the difference between the status parameters of the character and the another character increases.

2. A game machine for generating a game image and a game sound, said game machine comprising:

means for varying at least one of a pitch, volume, and tone of a voice sounded by a character that appears in a game, in accordance with a magnitude of remaining play time;

means for generating a game image that comprises an image of the character; and means for generating a game sound that comprises a voice of the character.

3. The game machine as defined in claim 2, wherein the pitch of the voice sounded by the character is raised and the volume of the voice sounded by the character is increased as the remaining play time decreases.

4. The game machine as defined in claim 2, wherein at least one of the pitch, volume, and tone of a voice sounded by a character is varied after the remaining play time has reached a given value.

5. The game machine as defined in claim 2, wherein an increase in the pitch of a voice sounded by the character is equal to or less than a whole tone from a pitch previously used.

6. A game machine for generating a game image and a game sound, said game machine comprising:

means for varying at least one of a pitch, volume, and tone of a voice sounded by a character that appears in a game, in accordance with a progressing degree through game stages;

means for generating a game image that comprises an image of the character; and means for generating a game sound that comprises a voice of the character, wherein the pitch of the voice sounded by the character is raised and the volume of the voice sounded by the character is increased as a sequence of game stages through which a game is played approaches a final game stage.

7. The game machine as defined in claim 6, wherein at least one of the pitch, volume, and tone of a voice sounded by a character is varied when the player has passed a given game stage of a sequence of game stages, through which the game is played.

8. A game machine for generating a game image and a game sound, said game machine comprising:

means for varying at least one of a pitch, volume, and tone of a voice sounded by a character that appears in a game, in accordance with a progressing degree through game stages;

means for generating a game image that comprises an image of the character; and means for generating a game sound that comprises a voice of the character, wherein at least one of the pitch, volume, and tone of a voice sounded by a character is varied when the player has passed a given game stage of a sequence of game stages, through which the game is played.

9. A game machine for generating a game image and a game sound, said game machine comprising:

means for varying at least one of a pitch, volume, and tone of a voice sounded by a character that appears in a game, in accordance with at least one of a magnitude of a number of wins of a player and a magnitude of a difference between numbers of wins of the player and another player;

means for generating a game image that comprises an image of the character; and means for generating a game sound that comprises a voice of the character.

10. The game machine as defined in claim 9, wherein the pitch or volume of a voice sounded by a character is increased as the difference between the numbers of wins of the player and the another player increases.

11. The game machine as defined in claim 9, wherein an increase in the pitch of a voice sounded by the character is equal to or less than a whole tone from a pitch previously used.

12. A game machine for generating a game image and a game sound, said game machine comprising:

means for varying at least one of a pitch, volume, and tone of a voice sounded by a character that appears in a game, in accordance with at least one of a magnitude of a status parameter of the character and a magnitude of a difference between status parameters of the character and another character;

means for generating a game image that comprises an image of the character; and means for generating a game sound that comprises a voice of the character, wherein an increase in the pitch of a voice sounded by the character is equal to or less than a whole tone from a pitch previously used.

13. A game machine for generating a game image and a game sound, said game machine comprising:

means for varying at least one of a pitch, volume, and tone of a voice sounded by a character that appears in a game, in accordance with a progressing degree through game stages;

means for generating a game image that comprises an image of the character; and means for generating a game sound that comprises a voice of the character, wherein an increase in the pitch of a voice sounded by the character is equal to or less than a whole tone from a pitch previously used.

14. A game machine for generating a game image and a game sound, said game machine comprising:

means for varying at least one of the basic frequency and volume of a voice sounded by a character that appears in the game, from a default value, in accordance with at least one of a magnitude of a status parameter of the character and a magnitude of a difference between status parameters of the character and another character;

means for generating a game image that comprises an image of the character; and means for generating a game sound that comprises a voice of the character.

15. The game machine as defined in claim 14, wherein the basic frequency or volume of a voice sounded by a character is varied from a default value in accordance with the magnitude of the difference between the status parameters of the character and the another character.

16. A game machine for generating a game image and a game sound, said game machine comprising:

means for varying at least one of the basic frequency and volume of a voice sounded by a character that appears in the game, from a default value, in accordance with a progressing degree through game stages;

means for generating a game image that comprises an image of the character; and means for generating a game sound that comprises a voice of the character.

17. The game machine as defined in claim 16, wherein the basic frequency or volume of a voice sounded by a character is varied from a default value as a sequence of game stages through which a game is played approaches a final game stage.

18. The game machine as defined in claim 16, wherein the basic frequency or volume of a voice sounded by a character is varied from a default value when the player has passed a given game stage of a sequence of game stages, through which the game is played.

19. A game machine for generating a game image and a game sound, said game machine comprising:

means for varying at least one of a pitch, volume, and tone of a voice sounded by a character that appears in a game, in accordance with at least one of a magnitude of a physical strength parameter of a character and a magnitude of a difference between physical strength parameters of the character and another character;

means for generating a game image that comprises an image of the character; and means for generating a game sound that comprises a voice of the character.

20. The game machine as defined in claim 19, wherein the pitch of the voice sounded by the character is raised and the volume of the voice sounded by the character is increased as the difference between physical strength parameters of the character and the another character increases.

21. An information storage medium which is capable of being used by a computer, for generating a game image and a game sound, said information storage medium comprising:

information for varying at least one of a pitch, volume, and tone of a voice sounded by a character that appears in a game, in accordance with at least one of a magnitude of a status parameter of the character and a magnitude of a difference between status parameters of the character and another character;

information for generating a game image that comprises an image of the character; and information for generating a game sound that comprises a voice of the character, wherein the pitch of the voice sounded by the character is raised and the volume of the voice sounded by the character is increased as the magnitude of the difference between the status parameters of the character and the another character increases.

22. An information storage medium which is capable of being used by a computer, generating a game image and a game sound, said information storage medium comprising:

information for varying at least one of a pitch, volume, and tone of a voice sounded by a character that appears in a game, in accordance with a magnitude of remaining play time;

information for generating a game image that comprises an image of the character; and information for generating a game sound that comprises a voice of the character.

23. The information storage medium as defined in claim 22, wherein the pitch of the voice sounded by the character is raised and the volume of the voice sounded by the character is increased as the remaining play time decreases.

24. The information storage medium as defined in claim 22, wherein at least one of the pitch, volume, and tone of a voice sounded by a character is varied after the remaining play time has reached a given value.

25. The information storage medium as defined in claim 22, wherein an increase in the pitch of a voice sounded by the character is equal to or less than a whole tone from a pitch previously used.

26. An information storage medium which is capable of being used by a computer, for generating a game image and a game sound, said information storage medium comprising:

information for varying at least one of a pitch, volume, and tone of a voice sounded by a character that appears in a game, in accordance with a progressing degree through game stages;

information generating a game image that comprises an image of the character; and information for generating a game sound that comprises a voice of the character, wherein the pitch of the voice sounded by the character is raised and the volume of the voice sounded by the character is increased as a sequence of game stages through which a game is played approaches a final game stage.

27. The information storage medium as defined in claim 26, wherein at least one of the pitch, volume, and tone of a voice sounded by a character is varied when the player has passed a given game state of a sequence of game stages through which the game is played.

28. An information storage medium which is capable of being used by a computer, for generating a game image and a game sound, said information storage medium comprising:

information for varying at least one of a pitch, volume, and tone of a voice sounded by a character that appears in a game, in accordance with a progressing degree through game stages;

information for generating a game image that comprises an image of the character; and information for generating a game sound that comprises a voice of the character, wherein at least one of the pitch, volume, and tone of a voice sounded by a character is varied when the player has passed a given game state of a sequence of game stages through which the game is played.

29. An information storage medium which is capable of being used by a computer, for generating a game image and a game sound, said information storage medium comprising:

information for varying at least one of a pitch, volume, and tone of a voice sounded by a character that appears in a game, in accordance with at least one of a magnitude of a number of wins of a player and a magnitude of a difference between numbers of wins of the player and another player;

information for generating a game image that comprises an image of the character; and information for generating a game sound that comprises a voice of the character.

30. The information storage medium as defined in claim 29, wherein the pitch or volume of a voice sounded by a character is increased as the difference between the numbers of wins of the player and the another player increases.

31. The information storage medium as defined in claim 22, wherein an increase in the pitch of a voice sounded by the character is equal to or less than a whole tone from a pitch previously used.

32. An information storage medium which is capable of being used by a computer, for generating a game image and a game sound, said information storage medium comprising:

information for varying at least one of a pitch, volume, and tone of a voice sounded by a character that appears in a game, in accordance with at least one of a magnitude of a status parameter of the character and a magnitude of a difference between status parameters of the character and another character;

information for generating a game image that comprises an image of the character; and information for generating a game sound that comprises a voice of the character, wherein an increase in the pitch of a voice sounded by the character is equal to or less than a whole tone from a pitch previously used.

33. An information storage medium which is capable of being used by a computer, for generating a game image and a game sound, said information storage medium comprising:

information for varying at least one of a pitch, volume, and tone of a voice sounded by a character that appears in a game, in accordance with a progressing degree through game stages;

information for generating a game image that comprises an image of the character; and information for generating a game sound that comprises a voice of the character, wherein an increase in the pitch of a voice sounded by the character is equal to or less than a whole tone from a pitch previously used.

34. An information storage medium which is capable of being used by a computer, for generating a game image and a game sound, said information storage medium comprising:

information for varying at least one of the basic frequency and volume of a voice sounded by a character that appears in the game, from a default value, in accordance with at least one of a magnitude of a status parameter of the character and a magnitude of a difference between status parameters of the character and another character;

information for generating a game image that comprises an image of the character; and information for generating a game sound that comprises a voice of the character.

35. The information storage medium as defined in claim 34, wherein the basic frequency or volume of a voice sounded by a character is varied from a default value in accordance with the magnitude of the difference between the status parameters of the character and the another character.

36. An information storage medium which is capable of being used by a computer, for generating a game image and a game sound, said information storage medium comprising:

information for varying at least one of the basic frequency and volume of a voice sounded by a character that appears in the game, from a default value, in accordance with a progressing degree through game stages;

information for generating a game image that comprises an image of the character; and information for generating a game sound that comprises a voice of the character.

37. The information storage medium as defined in claim 36, wherein the basic frequency or volume of a voice sounded by a character is varied from a default value as a sequence of game stages through which a game is played approaches a final game stage.

38. The information storage medium as defined in claim 36, wherein the basic frequency or volume of a voice sounded by a character is varied from a default value when the player has passed a given game stage of a sequence of game stages through which the game is played.

39. An information storage medium which is capable of being used by a computer, for generating a game image and a game sound, said information storage medium comprising:

information for varying at least one of a pitch, volume, and tone of a voice sounded by a character that appears in a game, in accordance with at least one of a magnitude of a physical strength parameter of a character and a magnitude of a difference between physical strength parameters of the character and another character;

information for generating a game image that comprises an image of the character; and information for generating a game sound that comprises a voice of the character.

40. The information storage medium as defined in claim 39, wherein the pitch of the voice sounded by the character is raised and the volume of the voice sounded by the character is increased as the difference between physical strength parameters of the character and the another character increases.

\* \* \* \* \*